(12) United States Patent
Lange

(10) Patent No.: US 8,489,290 B1
(45) Date of Patent: *Jul. 16, 2013

(54) FARM SIDEHILL COMPENSATION

(75) Inventor: Arthur F. Lange, Sunnyvale, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 217 days.

This patent is subject to a terminal disclaimer.

(21) Appl. No.: 12/803,773

(22) Filed: Jul. 6, 2010

Related U.S. Application Data

(63) Continuation of application No. 11/543,739, filed on Oct. 5, 2006, now Pat. No. 7,844,378.

(51) Int. Cl.
*G06F 19/00* (2011.01)
*G06F 7/70* (2006.01)

(52) U.S. Cl.
USPC .......... 701/50; 701/41; 701/23; 701/466; 280/400; 280/456.1; 172/282; 172/310

(58) Field of Classification Search
USPC .......... 701/466, 99, 411, 41, 50, 469, 412, 701/408, 23, 27, 468; 342/357.22, 367.36; 280/400, 456.1
See application file for complete search history.

(56) References Cited

U.S. PATENT DOCUMENTS

| | | | |
|---|---|---|---|
| D305,338 S | 1/1990 | Baillie | D15/199 |
| 5,170,849 A | 12/1992 | Nikkel et al. | 172/6 |
| 5,255,756 A | 10/1993 | Follmer et al. | 180/401 |
| 5,471,391 A | 11/1995 | Gudat et al. | 364/424.07 |
| 5,509,486 A | 4/1996 | Anderson | 172/6 |
| 5,549,166 A | 8/1996 | Orbach et al. | 172/4 |
| 5,592,382 A | 1/1997 | Colley | 701/467 |
| 5,786,789 A | 7/1998 | Janky | 342/357 |
| 5,915,313 A | 6/1999 | Bender et al. | |
| 5,928,309 A | 7/1999 | Korver et al. | 701/214 |
| 5,955,973 A | 9/1999 | Anderson | |
| 5,974,348 A | 10/1999 | Rocks | 701/28 |
| 5,991,694 A | 11/1999 | Gudat et al. | 702/2 |
| 5,995,902 A | 11/1999 | Monson | 701/468 |
| 6,052,647 A * | 4/2000 | Parkinson et al. | 701/23 |
| 6,070,539 A | 6/2000 | Flamme et al. | 111/177 |
| 6,070,673 A | 6/2000 | Wendte | 172/2 |
| 6,073,070 A | 6/2000 | Diekhans | 701/50 |
| 6,087,984 A | 7/2000 | Keller et al. | 342/357.17 |
| 6,088,644 A | 7/2000 | Brandt et al. | 701/50 |

(Continued)

FOREIGN PATENT DOCUMENTS

| | | |
|---|---|---|
| AU | 2004320401 B2 | 4/2009 |
| EP | 1756687 A1 | 2/2007 |

(Continued)

OTHER PUBLICATIONS

GPS-aided INS based control state calculation for AHS; Yang, Y.; Farrell, J.; Tan, H.-S; American Control Conference, 2001. Proceedings of the 2001; vol. 3; Digital Object Identifier: 10.1109/ACC. 2001.946098; Publication Year: 2001, pp. 2321-2326 vol. 3.*

(Continued)

*Primary Examiner* — Cuong H Nguyen
(74) *Attorney, Agent, or Firm* — Menlo Patent Agency LLC

(57) ABSTRACT

An apparatus and method using GNSS for dynamically adjusting side-to-side positioning of a farm implement along a geographical path.

26 Claims, 12 Drawing Sheets

U.S. PATENT DOCUMENTS

| | | | |
|---|---|---|---|
| 6,104,339 A | 8/2000 | Nichols | 342/357.06 |
| 6,131,062 A | 10/2000 | Nielsen | 701/50 |
| 6,185,492 B1 | 2/2001 | Kagawa et al. | 701/41 |
| 6,199,000 B1 | 3/2001 | Keller et al. | 701/50 |
| 6,272,405 B1 | 8/2001 | Kubota | 701/23 |
| 6,336,066 B1 | 1/2002 | Pellenc et al. | 701/50 |
| 6,377,889 B1 | 4/2002 | Soest | 701/207 |
| 6,385,515 B1 | 5/2002 | Dickson et al. | |
| 6,434,462 B1 | 8/2002 | Bevly et al. | 701/50 |
| 6,445,983 B1 | 9/2002 | Dickson et al. | 701/23 |
| 6,470,265 B1 | 10/2002 | Tanaka | 701/208 |
| 6,490,539 B1 | 12/2002 | Dickson et al. | 702/150 |
| 6,501,422 B1 | 12/2002 | Nichols | 342/357.17 |
| 6,522,948 B1 | 2/2003 | Benneweis | 700/243 |
| 6,539,303 B2 | 3/2003 | McClure et al. | 701/25 |
| 6,553,299 B1 | 4/2003 | Keller | 701/50 |
| 6,553,311 B2 | 4/2003 | Ahearn | 701/213 |
| 6,553,312 B2 | 4/2003 | Upadhyaya et al. | 701/213 |
| 6,553,925 B1 | 4/2003 | Beaujot | 111/14 |
| 6,567,747 B1 | 5/2003 | Lange et al. | 701/487 |
| 6,694,260 B1* | 2/2004 | Rekow | 701/466 |
| 6,703,973 B1* | 3/2004 | Nichols | 342/357.36 |
| 6,711,501 B2 | 3/2004 | McClure et al. | 701/23 |
| 6,721,453 B1 | 4/2004 | Benson et al. | 382/199 |
| 6,728,607 B1 | 4/2004 | Anderson | 701/25 |
| 6,789,014 B1* | 9/2004 | Rekow et al. | 701/25 |
| 6,804,587 B1 | 10/2004 | O Connor et al. | 701/26 |
| 6,865,465 B2 | 3/2005 | McClure | 701/50 |
| 6,876,920 B1* | 4/2005 | Mailer | 701/470 |
| 6,934,615 B2 | 8/2005 | Flann et al. | 701/50 |
| 6,990,399 B2 | 1/2006 | Hrazdera et al. | 701/50 |
| 7,054,731 B1 | 5/2006 | Lange et al. | 701/50 |
| 7,143,980 B2 | 12/2006 | Heller et al. | 244/136 |
| 7,162,348 B2* | 1/2007 | McClure et al. | 701/50 |
| 7,188,015 B2 | 3/2007 | Lange et al. | 701/50 |
| 7,212,938 B2 | 5/2007 | Mai | 702/104 |
| 7,225,060 B2 | 5/2007 | O'Connor et al. | 701/1 |
| 7,228,214 B2 | 6/2007 | Flann et al. | 701/50 |
| 7,263,422 B2 | 8/2007 | Lange et al. | 701/50 |
| 7,383,114 B1 | 6/2008 | Lange et al. | 701/50 |
| 7,395,769 B2 | 7/2008 | Jensen | 111/121 |
| 7,437,230 B2* | 10/2008 | McClure et al. | 701/50 |
| 7,460,942 B2 | 12/2008 | Mailer | 701/50 |
| 7,721,830 B2 | 5/2010 | Dunn et al. | 180/6.48 |
| 7,729,853 B2 | 6/2010 | Price et al. | 701/457 |
| 7,835,832 B2 | 11/2010 | Macdonald et al. | 701/24 |
| 7,844,378 B2* | 11/2010 | Lange | 701/50 |
| 8,019,506 B2 | 9/2011 | Markiton et al. | 701/41 |
| 2002/0022927 A1* | 2/2002 | Lemelson et al. | 701/301 |
| 2002/0072850 A1 | 6/2002 | McClure et al. | 701/213 |
| 2002/0072851 A1 | 6/2002 | Ahearn et al. | 701/213 |
| 2002/0165649 A1 | 11/2002 | Wilhelm Rekow et al. | 701/26 |
| 2002/0198654 A1 | 12/2002 | Lange et al. | 701/213 |
| 2003/0187560 A1 | 10/2003 | Keller et al. | 701/50 |
| 2003/0187577 A1 | 10/2003 | McClure et al. | 701/213 |
| 2003/0208311 A1* | 11/2003 | McClure | 701/50 |
| 2004/0111202 A1 | 6/2004 | Mailer | 701/50 |
| 2004/0124605 A1 | 7/2004 | McClure et al. | 280/456.1 |
| 2004/0186644 A1* | 9/2004 | McClure et al. | 701/50 |
| 2004/0210357 A1* | 10/2004 | McKay et al. | 701/23 |
| 2005/0015189 A1 | 1/2005 | Posselius et al. | 701/50 |
| 2005/0075785 A1 | 4/2005 | Gray et al. | 701/202 |
| 2005/0131640 A1 | 6/2005 | Price et al. | 701/209 |
| 2005/0171684 A1 | 8/2005 | Turner | 701/209 |
| 2005/0171693 A1 | 8/2005 | Lange et al. | 701/209 |
| 2006/0025894 A1 | 2/2006 | O'Connor et al. | 701/1 |
| 2006/0116798 A1 | 6/2006 | Gibson et al. | 701/26 |
| 2006/0142936 A1 | 6/2006 | Dix | 701/200 |
| 2006/4116798 | 6/2006 | Gibson et al. | 701/26 |
| 2006/0178825 A1 | 8/2006 | Eglington et al. | 701/211 |
| 2006/0195238 A1 | 8/2006 | Gibson et al. | 701/23 |
| 2006/0200294 A1 | 9/2006 | Scheufler et al. | 701/50 |
| 2006/0237200 A1 | 10/2006 | Unruh et al. | 172/2 |
| 2006/0271348 A1 | 11/2006 | Rossow et al. | 703/26 |
| 2006/0282205 A1 | 12/2006 | Lange | 701/50 |
| 2007/0175198 A1 | 8/2007 | Viaud et al. | 56/341 |
| 2008/0039991 A1* | 2/2008 | May et al. | 701/25 |
| 2008/0086249 A1* | 4/2008 | Lange | 701/41 |
| 2010/0017075 A1 | 1/2010 | Beaujot | 701/50 |

FOREIGN PATENT DOCUMENTS

| | | |
|---|---|---|
| EP | 2029969 A2 | 3/2009 |
| WO | WO 02/080652 A1 | 10/2002 |
| WO | WO 2005/119386 A1 | 12/2005 |
| WO | WO 2006002360 A1 | 1/2006 |
| WO | WO 2007145703 A2 | 12/2007 |
| WO | WO 2007084965 A3 | 10/2008 |

OTHER PUBLICATIONS

GPS tracking of intermodal transportation: System integration with delivery order system; Heywood, C.; Connor, C.; Browning, D.; Smith, M.C.; Jianping Wang; Systems and Information Engineering Design Symposium, 2009. SIEDS '09; Digital Object Identifier: 10.1109/SIEDS.2009.5166179; Publication Year: 2009, pp. 191-196.*

The integration of GPS and interferometric Quantum Position System for high dynamic precise positioning; Chunyan Yang; Dewei Wu; Yonglin Yu; Information and Automation (ICIA), 2010 IEEE International Conference on; Digital Object Identifier: 10.1109/ICINFA.2010.5512389; Publication Year: 2010, pp. 508-512.*

G. O. Harries & B. Ambler, "Automatic Ploughing: A Tractor Guidance System Using Opto-electronic Remote Sensing Techniques and a Microprocessor Based Controller", Proc. agric. Engng. Res. (1981) 26, 33-53, British Society for Research in Agricultural Engineering .Copyrgt. 1981, pp. 33-53.*

A study on GPS integrity monitoring algorithms based on ultra-tight integration system; Li Fu; Yongquan Zhu; Industrial Electronics and Applications (ICIEA), 2011 6th IEEE Conference on; Digital Object Identifier: 10.1109/ICIEA.2011.5975655 Publication Year: 2011, pp. 596-600.*

GPS tracking of intermodal transportation: System integration with delivery order system; Heywood, C.; Connor, C.; Browning, D.; Smith, M.C.; Jianping Wang; Systems and Information Engineering Design Symposium. 2009. SIEDS '09; Digital Object Identifier: 10.1109/SIEDS.2009.5166179; Publication Year: 2009, pp. 191-196.*

Application and analysis of a robust trajectory tracking controller for under-characterized autonomous vehicles; Wise, M. et al.; Control Applications, 2008, CCA 2008. IEEE International Conference on; Digital Object Identifier. 10.1109/CCA.2008.4829651 Publication Year: 2008, pp. 274-280.*

Orthman Manufacturing, Inc., Lexington, Nebraska, "Home | Orthman Ag Products | Industrial Products | Industrial Products | New Product Announcements | Farm Show Schedule | Dealership Locator | Literature Room | Dealer Communications | Tech Service | Company e-mail", 34 pages from www.orthman.com on Jul. 15-19, 2003.

Sukup Manufacturing Company, Sheffield, Iowa, "Sukup Locations Distributions Centers, From Planting to Harvest Sukup Fills Your Bin With Quality, Field Equipment, Guidance Systems, Flail Shredders, Guidance Sensing Options", 15 pages from www.sukup.com, Jul. 15-19, 2003.

USPTO action papers mailed Aug. 23, 2010 for record display forms for U.S. Appl. No. 11/543,739, 14 pages.

USPTO action papers mailed Sep. 17, 2010 for U.S. Appl. No. 11/148,870, 8 pages.

USPTO action papers mailed Sep. 30, 2010 for U.S. Appl. No. 11/148,870, 13 pages.

USPTO action papers mailed Jan. 20, 2010 for U.S. Appl. No. 11/543,739, 15 pages.

USPTO action papers mailed May 27, 2010 for U.S. Appl. No. 11/543,739, 7 pages.

USPTO action papers mailed Jul. 9, 2010 for U.S. Appl. No. 11/543,739, 3 pages.

A GPS-Reflections Receives That Computes Doppler/Delay Maps in Real Time; Nogues•Correig, O.; Cardellach Gali. E.; Sanz Campderros, J.; Rius, A.: Geoscience and Remote Sensing. IEEE Transactions on; vol. 45, Issue 1, Jan. 2007 pp. 156-174: Digital Object Identifier 10.1109/TGRS.2006.882257.

Broadband communications via high-altitude platforms: a survey; Karapantazis. S.; Pavlidou, F.; Communications Surveys & Tutorials, IEEE; vol. 7, Issue 1, First Qtr. 2005 pp. 2-31.

The Sentinel-3 mission and its topography element; Mavrocordatos, C.; Berruti, B.; Aguirre, M.; Drinkwater, M.; Geoscience and Remote Sensing Symposium, 2007, IGARSS 2007, IEEE International; Jul. 23-28, 2007 pp. 3529-3532 Digital Object Identifier 10.1109/IGARSS.2007.4423607.

TanDEM•X: A Satellite Formation for High-Resolution SAR Interferometry; Krieger, G.; Moreira, A.; Fiedler, H.; Hajnsek, I.; Werner, M.; Younis, M.; Zink. M.: Geoscience and Remote Sensing, IEEE Transactions on; vol. 45. issue 11. Part 1. Nov. 2007 pp. 3317-3341; Digital Object Identifier 10.1109/TGRS.2007.900693.

Application and analysis of a robust trajectory tracking controller for under-characterized autonomous vehicles: Wise, M. et al.; Control Applications, 2008. CCA 2008, IEEE International Conference on; Digital Object Identifier. 10.1109/CCA.2008.4629651 Publication Year: 2008, pp. 274-280.

Path Error Measurement and Compensation of Precision Working Table; Cao Jun et al.; Mechatronics and Machine Vision in Practice, 2008, M2VIP 2008. 15th International Conference on; Digital Object Identifier: 10.1109/MMVIP.2008.4749572 Publication Year: 2008, pp. 429-434.

Polarimetric Features of Oyster Fawn Observed by AIRSAR and JERS-1; Seung-Kuk Lee et el.; Geoscience and Remote Sensing, IEEE Transactions on; vol. 44, Issue: 10, Part: 1; Digital Object Identifier: 10.1109/TGRS.2008.879107 Publication Year, 2006, pp. 2728-2738.

The phase compensation scheme for multiple planar antenna on the SOTM; Qiong Wang at al.; Industrial Electronics and Applications, 2009. ICIEA 2009. 4th IEEE Conference on; Digital Object Identifier: 10.1109/ICIEA.2009.5138511 Publication Year: 2009, pp. 1815-1818.

USPTO action papers mailed Jan. 10, 2007 for U.S. Appl. No. 11/148,870, 6 pages.

USPTO action papers mailed Jun. 8, 2007 for U.S. Appl. No. 11/148,870, 22 pages.

USPTO action papers mailed Oct. 5, 2007 for U.S. Appl. No. 11/148,870, 18 pages.

USPTO action papers mailed Dec. 13, 2007 for U.S. Appl. No. 11/148,870, 3 pages.

USPTO action papers mailed Feb. 27, 2008 for U.S. Appl. No. 11/148,870, 3 pages.

USPTO action papers mailed May 12, 2008 for U.S. Appl. No. 11/148,870, 31 pages.

USPTO action papers mailed May 19, 2005 for U.S. Appl. No. 10/652,454, 13 pages.

USPTO action papers mailed Aug. 25, 2005 for U.S. Appl. No. 10/652,454, 13 pages.

USPTO action papers mailed Oct. 19, 2005 for U.S. Appl. No. 10/652,454, 3 pages.

USPTO action papers mailed Dec. 8, 2005 for U.S. Appl. No. 10/652,454, 2 pages.

USPTO action papers mailed Mar. 27, 2006 for U.S. Appl. No. 10/652,454, 4 pages.

USPTO action papers mailed Jan. 25, 2007 for U.S. Appl. No. 11/400,126, 10 pages.

USPTO action papers mailed May 21, 2007 for U.S. Appl. No. 11/400,126, 7 pages.

USPTO action papers mailed Jan. 9, 2008 for U.S. Appl. No. 11/400,126, 2 pages.

USPTO action papers mailed Apr. 1, 2008 for U.S. Appl. No. 11/400,126, 7 pages.

G. O. Harries & B. Ambler, "Automatic Ploughing: A Tractor Guidance System Using Opto-electronic Remote Techniques and a Microprocessor Based Controller", Proc. agric. Engng. Res. (1981) 26,33-53, British Society for Research in Agricultural Engineering © 1981, pp. 33-53.

TRI-R Innovations, Inc., Gibson City, IL, 26 pictures for Robotic Driver Model IV.

USPTO action papers mailed Jul. 9, 2012 for U.S. Appl. No. 12/927,427.

USPTO action papers mailed Mar. 12, 2012 for U.S. Appl. No. 12/927,427, 22 pages.

\* cited by examiner

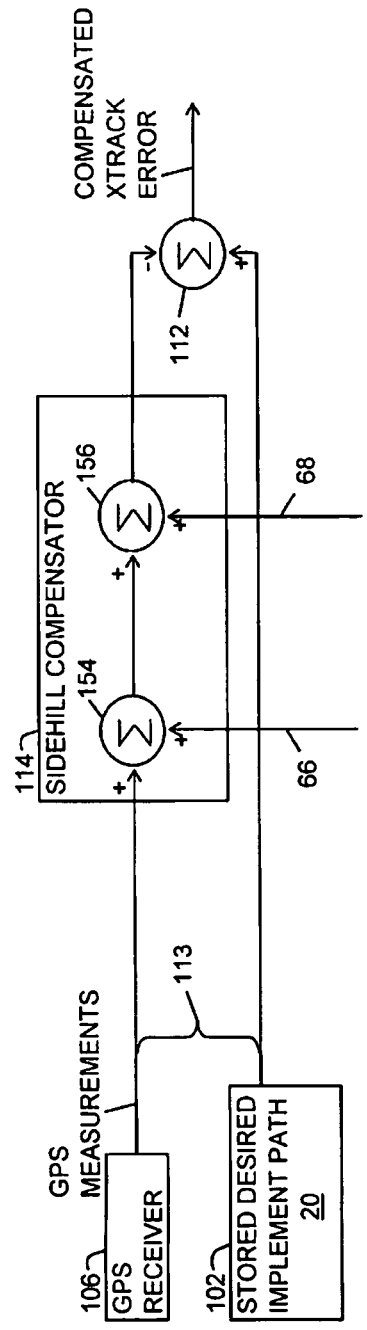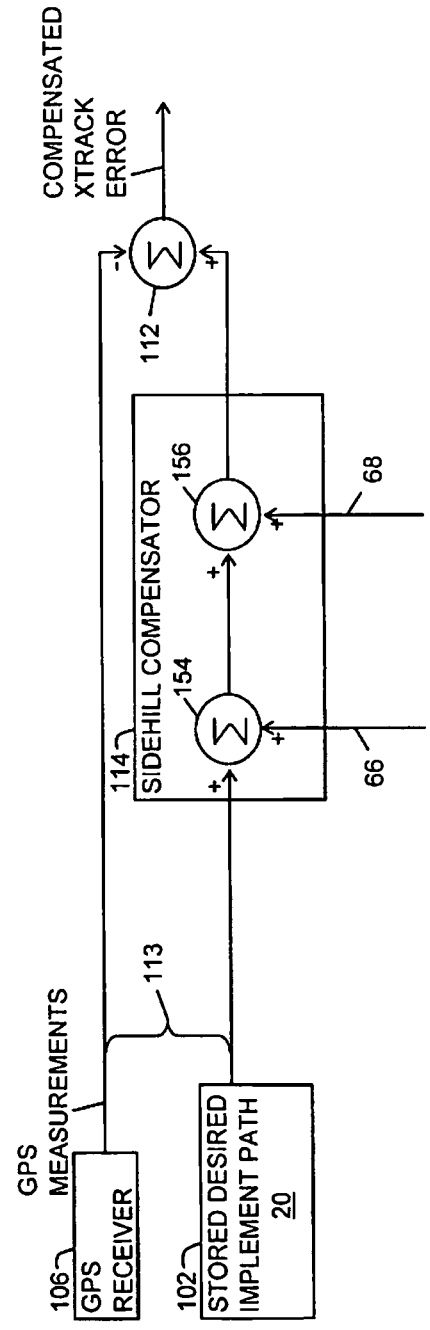

| ROLL ANGLES | MEASURED TRACKING ERRORS | COMPUTED TRACKING COMPENSATIONS 1st ORDER | COMPUTED TRACKING COMPENSATIONS 2nd ORDER | COMPUTED TRACKING COMPENSATIONS 3rd ORDER | COMPUTED TRACKING COMPENSATIONS 5th ORDER |
|---|---|---|---|---|---|
| -10 | -16 | 14.5 | 14.6 | 16.3 | 16.5 |
| -9 | -14 | 13.0 | 13.1 | 13.7 | 14.3 |
| -8 |  | 11.6 | 11.7 | 11.4 | 12.0 |
| -7 | -10 | 10.2 | 10.2 | 9.4 | 9.7 |
| -6 | -7 | 8.7 | 8.7 | 7.6 | 7.6 |
| -5 | -6 | 7.3 | 7.2 | 6.0 | 5.8 |
| -4 |  | 5.9 | 5.8 | 4.6 | 4.2 |
| -3 | -3 | 4.5 | 4.3 | 3.3 | 2.9 |
| -2 |  | 3.0 | 2.9 | 2.2 | 1.9 |
| -1 |  | 1.6 | 1.4 | 1.1 | 0.9 |
| 0 | -0.2 | 0.2 | 0.0 | 0.0 | 0.1 |
| 1 |  | -1.3 | -1.4 | -1.0 | -0.8 |
| 2 |  | -2.7 | -2.8 | -2.1 | -1.7 |
| 3 | 3 | -4.1 | -4.2 | -3.2 | -2.8 |
| 4 |  | -5.5 | -5.6 | -4.5 | -4.1 |
| 5 | 6 | -7.0 | -7.0 | -5.8 | -5.6 |
| 6 | 7 | -8.4 | -8.4 | -7.3 | -7.4 |
| 7 | 9 | -9.8 | -9.8 | -9.0 | -9.4 |
| 8 |  | -11.3 | -11.2 | -10.9 | -11.6 |
| 9 | 14 | -12.7 | -12.6 | -13.1 | -13.7 |
| 10 | 15 | -14.1 | -13.9 | -15.6 | -15.7 |
| $R^2$ VALUES |  | 0.9858 | 0.986 | 0.9981 | 0.9989 |

*Fig. 7*

FARM SIDEHILL COMPENSATION

CROSS REFERENCE TO RELATED APPLICATIONS

This application is a continuation of application Ser. No. 11/543,739 filed Oct. 5, 2006 now U.S. Pat. No. 7,844,378 entitled "farm apparatus having implement sidehill drift compensation" by the same inventor for the same assignee

BACKGROUND

1. Field of the Invention

The invention relates generally to farm guidance systems and more particularly to a farm vehicle guidance system using implement sidehill drift compensation with global navigation satellite system (GNSS) positioning.

2. Description of the Background Art

Global navigation satellite systems (GNSS), especially the global positioning system (GPS), is now commonly used for steering tractors. The tractor measures its path by processing GNSS positioning signals that it receives at a GNSS antenna. An autopilot or a driver steers the tractor by minimizing a crosstrack error between the path measured for the GNSS antenna and a desired path for a farm implement that is pulled by the tractor. Recent developments of precise positioning with differential (DGPS) and real time kinematic (RTK) GPS carrier phase corrections have made it possible for farmers to map furrows within a field and then return to those furrows with the accuracy that is required for planting and cultivating.

Two-dimensional horizontal positioning is normally used with the assumption that the tractor is on horizontal ground. The horizontal assumption enables a farm system to calibrate the position of the GNSS antenna on the tractor to a position vertically above the effective point on the ground for the implement. The GNSS antenna is most advantageously mounted high on the tractor in order to have a clear line-of-sight to the GNSS satellites. However, this presents a problem called roll error when the tractor is on a sidehill because the height of the antenna and the lateral angle of the sidehill displaces the antenna's two-dimensional horizontal position to the side of the implement ground point.

Existing farm guidance systems compensate for sidehill roll error using an inclinometer for measuring a roll angle and then using the sine of the roll angle times the height of the GNSS antenna for compensating for the roll error. However, sidehills also present tracking errors due to yaw and implement drift. Yaw error results from the lead length of the GNSS antenna in front of the effective implement ground point and the uphill crabbing angle of the tractor as the tractor attempts to compensate for its sideways downhill slippage. Implement sidehill drift is due to lateral sideways downhill slippage of the implement relative to the tractor. The effects of yaw, crabbing, and drift combine to cause an implement sidehill tracking error.

The sidehill errors of the roll error, implement sidehill drift and yaw error are all functions of the roll angle. Therefore, it might seem that a total sidehill compensation could be computed directly from the roll angle, the lead length of the antenna, and the use of a selected height that is different than the actual GNSS antenna height. The difference between the actual GNSS antenna height and the height that is used is selected in order to compensate for the combination of the effects of the roll error and the tracking errors due to yaw and implement sidehill drift.

Unfortunately, when this is done it causes a problem for the dynamics of automatic steering for the tractor autopilot. When the tractor is driving along its path on the field it is also rolling side to side due to uneven ground. This rolling has an accentuated effect on the GNSS-measured positions due to the height of the GNSS antenna. Tractor steering automatic steering systems have loop stability equations that are carefully designed with the use of the antenna height in the optimization of a tradeoff between having a fast response time and avoiding significant overshoots in the steering of the tractor. If the GNSS antenna height that used in the design of the equations is not the true height, the steering system causes the tractor path to be slow to respond or to have large side-to side oscillating errors.

There is a need for a farming guidance system using a tractor-vehicle mounted GNSS positioning system with roll and tracking compensations for sidehills.

SUMMARY

This disclosure describes a farm guidance apparatus and method for steering a vehicle to minimize a compensated crosstrack error for a vehicle path so that an implement that is connected with the vehicle is guided to a desired implement path. The apparatus and method are beneficial when the desired implement path has a sideways slope.

The apparatus can be implemented with a compensation computer and a sidehill compensator. The compensation computer computes a sidehill tracking compensation according to a variable sidehill tracking function of a roll angle where the variable sidehill tracking function has been determined to compensate an implement tracking error corresponding to the roll angle. The sidehill compensator determines a sidehill compensated crosstrack error based on GNSS position measurements of the vehicle, the desired implement path, and the sidehill tracking compensation. A global navigation satellite system (GNSS) receiver may be used to make the GNSS position measurements for the position of a GNSS antenna mounted on the vehicle.

BRIEF DESCRIPTION OF THE DRAWINGS

FIGS. 3A-D are block diagrams for variations of the farm apparatus of FIG. 3;

FIG. 7, described in the specification as TABLE 1, shows exemplary tracking errors and compensations.

DETAILED DESCRIPTION

The details of several embodiments will now be described. After reading these details, several subsets and equivalents and supersets of the embodiments will undoubtedly be apparent to someone skilled in the art as within the scope of this description. It should be understood that it is not necessary to employ all of these details in order to carry out the essence of the idea that is presented.

The disclosure is described in terms of the global positioning system (GPS). However, the idea may be carried out with a global navigation satellite system (GNSS) where the global positioning system (GPS), the global orbiting navigation system (GLONASS), the Galileo system or the like, or a combination of these systems provides positioning signals. It should also be noted that pseudolites may be used in place of satellites for broadcasting GNSS signals.

Figure 1:
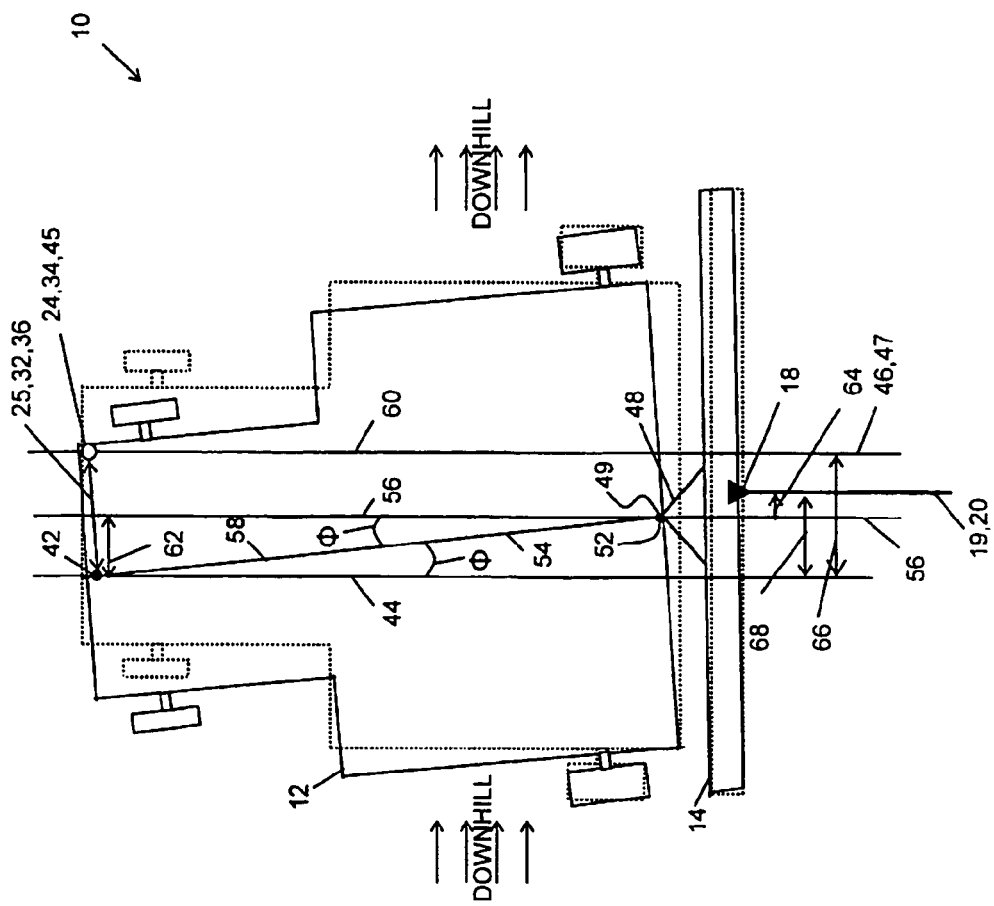
FIG. 1 is a top view ground projection of a farm guidance system having sidehill roll and tracking compensations.
Figure 2:
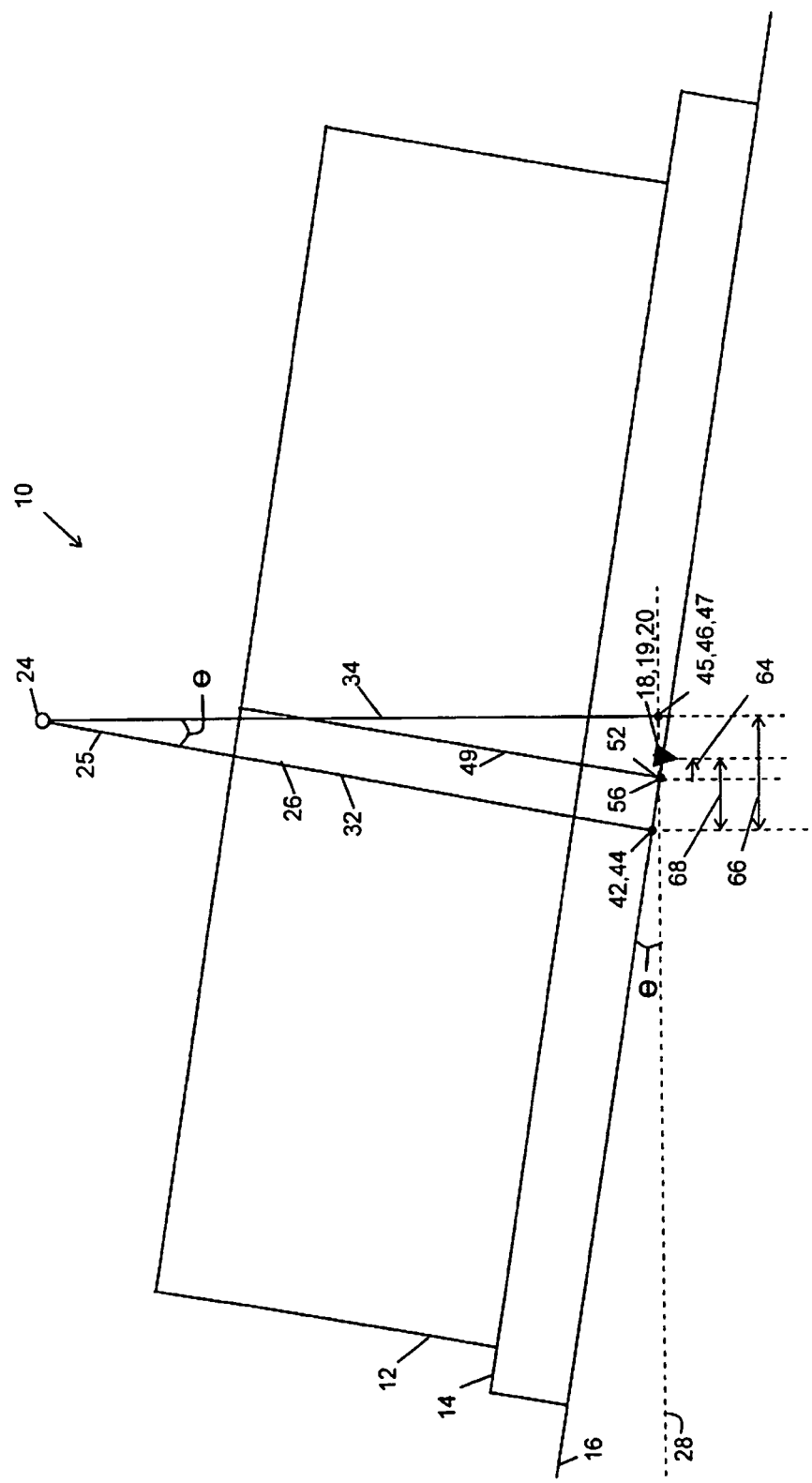
FIG. 2 is a rear view of the farm guidance system of FIG. 1.

FIGS. 1 and 2 are top and rear views, respectively, of a farm system 10 where a vehicle 12 is pulling an implement 14 on the ground of a sidehill 16. The implement 14 has an effective position point 18. The farm apparatus 100 (FIG. 3) guides the implement position point 18 on an actual path 19 that matches a desired path 20. The vehicle 12 and the implement 14 have a combined yaw angle $\Phi$. The solid lines show positions and directions of the vehicle 12 and the implement 14 with the yaw angle $\Phi$. The dotted lines show the positions and the directions that the vehicle 12 and the implement 14 would have if there was no yaw angle $\Phi$.

A GPS antenna 24 mounted on a mast 25 is carried by the vehicle 12 at a height 26 above the sidehill ground 16. The vehicle 12 has a roll angle $\theta$ equal to the cross sectional angle between a horizontal plane 28 and the sidehill ground 16. An antenna perpendicular line 32 extends from the GPS antenna 24 perpendicular to the sidehill ground 16. An antenna vertical line 34 extends from the GPS antenna 24 vertically to the sidehill ground 16. The angle between the antenna perpendicular line 32 and the antenna vertical line 34 is the roll angle $\theta$. The sine of the roll angle $\theta$ times the cosine of the yaw angle $\Phi$ approximately projects the height 26 of the GPS antenna 24 as a sidehill roll error 36 perpendicular to the desired implement path 18 on the horizontal plane 28. Typically, the cosine of the yaw angle $\Phi$ is close enough to one so that its effect can be neglected in this approximation.

The antenna perpendicular line 32 intersects the sidehill ground 16 at an antenna perpendicular position 42. As the vehicle 12 drives forward, the position 42 traces an antenna perpendicular path 44 on the sidehill ground 16. The antenna vertical line 34 intersects the horizontal plane 28 at a position 45. The position 45 is the position that is measured by processing the GPS positioning signals received by the GPS antenna 24. As the vehicle 12 drives forward, the measured GPS positions 45 trace a measured GPS path 46. The measured GPS path 46 is the compensated vehicle path 47 when the vehicle 12 is correctly compensated to steer so that the implement position point 18 is on the desired implement path 20.

A hitch 48 connects the implement 14 to the vehicle 12 on a center line 49 that bisects the vehicle 12 at the center rear of the vehicle 12. The intersection of the center line 49 and the sidehill ground 16 is a hitch center ground position 52. The vehicle 12 has a fore-aft center line 54 passing through the antenna perpendicular position 42 and the hitch center ground position 52. As the vehicle 12 drives forward, the hitch center ground position 52 traces a hitch center path 56 on the sidehill ground 16. The hitch center path 56 and the antenna perpendicular path 44 are parallel but offset by a yaw error 62.

The distance between the antenna perpendicular position 42 and the hitch center ground position 52 is an antenna lead length 58. The angle between the vehicle fore-aft center line 54 and the hitch center path 56 is the yaw angle $\Phi$. The sine of the yaw angle $\Phi$ times the cosine of the roll angle $\theta$ approximately projects the antenna lead length 58 perpendicular to the desired implement path 20 on the horizontal plane 28 as the yaw error 62. Typically, the effect of the cosine of the roll angle is $\Phi$ is close enough to one so that its effect can be neglected in this approximation. The yaw error 62 is also known as a crabbing error because it results from the vehicle 12 moving in a direction to the side of the direction that it is pointed in the way that a crab moves.

As the vehicle 12 moves forward on the sidehill, the implement 14 slides downhill by an implement sidehill drift error 64. The vehicle navigation apparatus 100 (FIG. 3) computes a geometric roll height compensation 66 to compensate for the roll error 36 and an empirical tracking compensation 68 to compensate for the sum of the yaw error 62 and the implement sidehill drift 64.

For the convenience of the reader, the references identification numbers for FIGS. 1 and 2 are listed below.

system, 10
vehicle, 12
implement, 14
sidehill ground, 16
effective implement position point, 18
implement actual path, 19
desired implement path, 20
yaw angle, $\Phi$
GPS antenna, 24
mast, 25
height, 26
roll angle, $\theta$
horizontal plane, 28
antenna perpendicular line, 32
antenna vertical line, 34
sidehill roll error, 36
antenna perpendicular position, 42
antenna perpendicular path, 44
ground GPS measured position, 45
GPS measured path, 46
compensated vehicle path, 47
hitch, 48
vehicle center line, 49
hitch center ground position, 52
vehicle fore-aft center line, 54
hitch center path, 56
antenna lead length, 58
yaw error, 62
implement sidehill drift, 64
roll height compensation, 66
tracking compensation, 68

Figure 3:
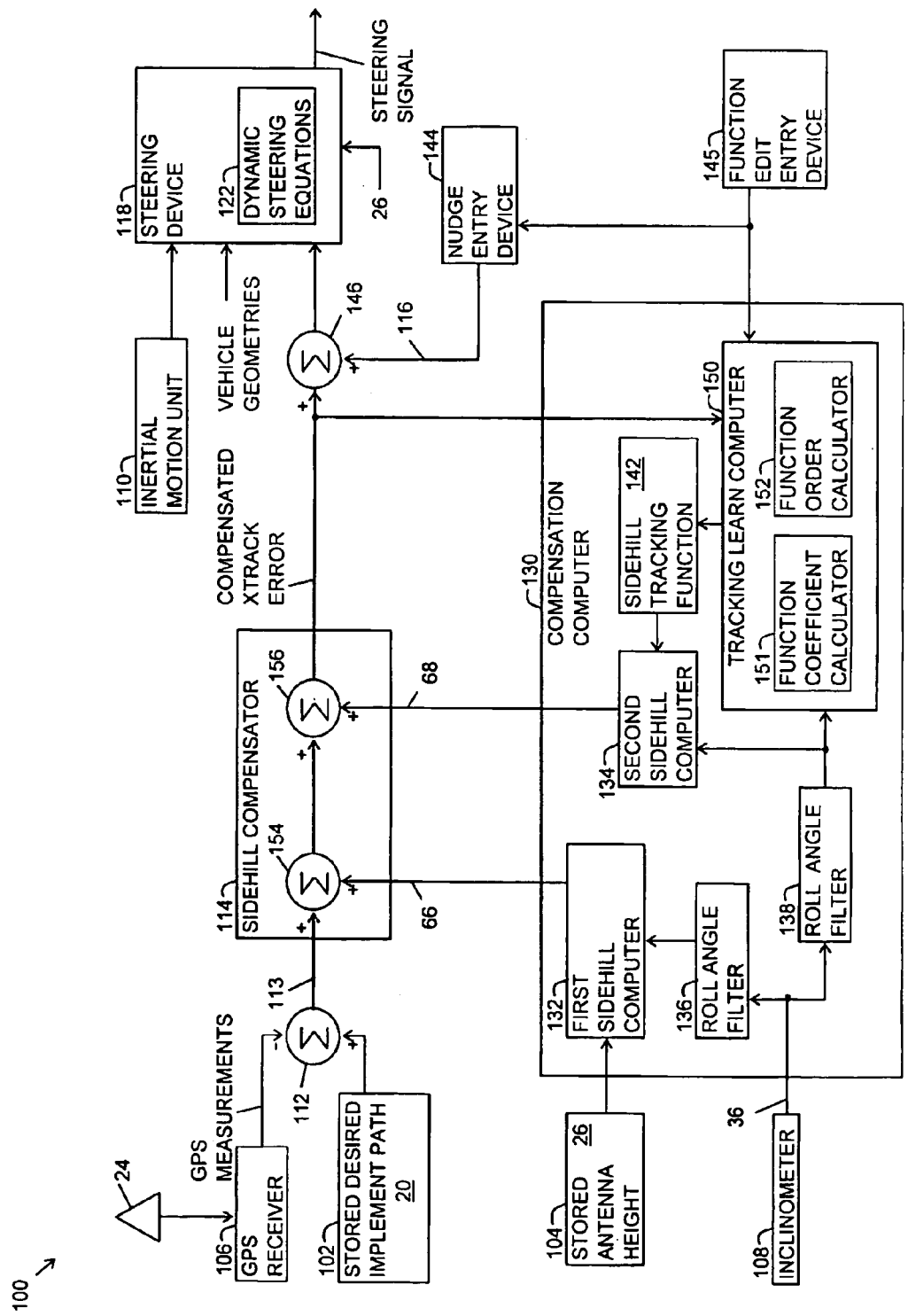
FIG. 3 is a block diagram of an apparatus for the farm guidance system of FIGS. 1 and 2.

FIG. 3 is a block diagram of the farm apparatus referred to by the reference number 100. Data for the desired implement path 20 is stored in a memory 102. Data for the antenna height 26 is entered by a provider or user of the vehicle 12 and then stored in a memory 104. The GPS antenna 24 receives GPS signals broadcast by GPS satellites and passes the signals to a GPS receiver 106. The GPS receiver 106 uses the GPS signals for measuring GPS-based positions of the GPS antenna 24. Preferably, the GPS receiver 106 is equipped for precise positioning using differential GPS or real time kinematic (RTK) GPS techniques. An inclinometer 108 is mounted on the vehicle 12 for providing the roll angle $\theta$ described above for FIGS. 1 and 2. The inclinometer 108 may be a part of an inertial motion unit 110.

A crosstrack summer 112 determines a raw crosstrack error or path-GPS difference 113 for the difference between the desired implement path 20 and the measurements of the GPS-based positions for the GPS measured path 46. A sidehill compensator 114 compensates for the roll error 36, the yaw error 62 and the implement drift error 64 by adding the roll height compensation 66 and the tracking compensation

68 to the path-GPS difference 113 in order to provide a compensated crosstrack error. In normal operation (with no nudge difference 116) a steering device 118 displays the compensated crosstrack error to a driver and/or provides a steering signal to an autopilot to steer the vehicle 12 in order to minimize the compensated crosstrack error. While the vehicle steering is being nudged, the steering device 118 operates on the compensated crosstrack error plus the nudge difference 116.

The inertial motion unit 110 measures the motion of the vehicle 12 and passes the motion measurements to the steering device 118. The motion measurements may include but are not limited to pitch angle, roll angle, yaw angle, rate of change of pitch angle, rate of change of yaw angle, rate of change of roll angle, rate of change of yaw angle, speed, acceleration and direction. The inclinometer 108 may be a part of the inertial motion unit 110 for providing the roll angle 36. The steering device 118 includes dynamic steering equations 122. The dynamic steering equations 122 use the motion measurements from the inertial motion unit 110, Doppler GNSS measurements from the GPS receiver 106, the height 26 and other geometric information about the vehicle 12, such as the antenna lead length 58 and the wheel base of the vehicle 12, together with the compensated crosstrack error for providing the steering signal.

The farm apparatus 100 includes a compensation computer 130 including first and second sidehill compensation computers 132 and 134, and second roll angle filters 136 and 138. The roll angle filters 136 and 138 filter the roll angle $\theta$ measured by the inclinometer 108 for providing time constants in the range of ½ to 1½ seconds, preferably about one seconds. The first sidehill computer 132 uses a fixed function of the roll angle $\theta$ and the true height 26 of the GNSS antenna 24 for computing the roll height compensation 66 with trigonometry and geometry. The roll height compensation 66 is computed by the first sidehill computer 132 by multiplying the antenna height 26 by the sine of the filtered roll angle $\theta$.

A sidehill tracking function 142 is stored in a memory in the form of one or more lookup tables or equations or a combination of lookup tables and equations. The filtered roll angle $\theta$ is applied to the sidehill tracking function 142 as an independent variable in an equation and/or an entry into a table for computing the sidehill tracking compensation 68. Equations may be used for interpolation or extrapolation from a lookup table. The height 26 is not used in the sidehill tracking function 142. The roll filters 136 and 138 may be disposed for filtering the roll height compensation 66 and the tracking compensation 68.

The sidehill tracking function 142, abbreviated STF may take the form of an equation having an order of one, that is $STF=A_0+A_1 f(\theta)$ where $A_0$ and $A_1$ are coefficients of the sidehill tracking function 142 and $f(\theta)$ is a function of the filtered roll angle $\theta$, preferably the sine of the filtered roll angle $\theta$. However, the function 142 is expected to take the form of an equation having an order greater than one. In general, the $STF=A_0+A_1 f(\theta)+A_2 f^2(\theta)+A_3 f^3(\theta)+ \ldots$ where $A_0, A_1, A_2, A_3$ and so on, are the coefficients of the sidehill tracking function 142, $f(\theta)$ is a function of the filtered roll angle $\theta$, preferably the sine of the filtered roll angle $\theta$, and the exponents 2, 3 and so on, are the square, cube, and so on of the function $f(\theta)$.

The sidehill tracking function 142 is a variable function that is determined empirically for the particular vehicle 12 and implement 14 in order to provide the tracking compensation 68 that compensates for at least one and preferably several roll angles $\theta$. In order to aid in this determination a nudge entry device 144 is provided. The driver of the vehicle 12 uses the nudge entry device 144 to nudge the steering of the vehicle 12 until the actual implement path 19 aligns with the desired implement path 20. Then the driver activates a function edit entry device 145 to edit the function 142 to provide a new tracking compensation 68 for the current filtered roll angle $\theta$ so that second sidehill computer 134 computes the new sidehill tracking compensation 68 that causes the vehicle 12 to be steered to path to which it was nudged.

In the empirical determination of the sidehill tracking function 142, weighted averaging and curve fitting may be used. For weighted averaging the most recent determinations are given more weight than older determinations for editing the sidehill tracking function 142. It may be desirable to edit the sidehill tracking function 142 so that the function 142 provides the tracking compensation 68 that as nearly as possible exactly compensates the path-GPS difference 113 at the filtered roll angle $\theta$ for the most recent function edit entry. When there is more independent data than the order of the function 142, curve fitting may use overdetermination mathematical techniques, such at least squares error allocation, for determining the coefficients of the function 142.

In order to nudge the vehicle 12 to the left or right, a driver operates a nudge entry device 144. The nudge entry device 144 provides a nudge difference 116 to a nudge summer 146. The nudge summer 146 adds the nudge difference 116 to the compensated crosstrack error for providing steering input to the steering device 118. One effect of the nudge difference 116 is to steer the vehicle 12 so that the GPS measured path 46 and the compensated vehicle path 47 (the path that would be steered by minimizing the compensated crosstrack error) differ by the nudge difference 116.

Because the vehicle 12 is steered to minimize the sum of the nudge difference 116 and the compensated crosstrack error, the compensated crosstrack error will take on the value of the negative of the nudge difference 116. This value is passed to a sidehill tracking learn computer 150. The sidehill tracking learn computer 150 uses the current compensated crosstrack error and the current filtered roll angle $\theta$ for editing a duplicate copy of the sidehill tracking function 142 so that the duplicate copy would provide the new tracking compensation 68 that would bring the compensated crosstrack error to zero for the current path of the vehicle 12. The tracking learn computer 150 includes a function coefficient calculator 151 for calculating the coefficients of the sidehill tracking function 142 and a function order calculator 152 for calculating the order of the sidehill tracking function 142.

Sighting astern, when the driver sees that the actual implement path 19 aligns with the desired implement path 20, the driver activates the function edit entry device 145. The function edit entry device 145 passes a function freeze signal to the tracking learn computer 150 and the nudge entry device 144. When the function freeze signal is received, the tracking learn computer 150 enters the edited copy into the sidehill tracking function 142 and the nudge entry device 144 resets the nudge difference 116 to zero. The compensated crosstrack error is now near zero for the correct steering of the vehicle 12 and the steering device 118 steers the vehicle 12 for minimizing the compensated crosstrack error. The vehicle 12 is now steered by the compensated crosstrack error to the compensated vehicle path 47 that causes the actual implement path 19 to match or nearly match the desired implement path 20. It may be noted that the empirical determination of the sidehill tracking function 142 compensates for the second order effect of the cosine of the yaw angle for the computation of the roll height compensation 66.

The sidehill compensator 114 includes first and second compensation summers 154 and 156. The first compensation summer 154 adds the roll height compensation 66 to the path-GPS 113 difference for providing an intermediate crosstrack error. The second compensation summer 156 adds the sidehill tracking compensation 68 to the intermediate crosstrack error for providing the compensated crosstrack error. It should be noted that the first and second compensation summers 154 and 156 may be in either order. Further, it should be noted that the sidehill roll and tracking compensations may be added together and the sum added to the path-GPS difference 113 for providing the compensated crosstrack error.

FIGS. 3A-3D show variations for making the roll and tracking compensations 66 and 68. Either or both of the roll and tracking compensations 66 and 68 may be applied directly to the desired implement path 20 for providing a compensated desired implement path. Or, either or both of the roll and tracking compensations 66 and 68 may be applied directly to the GPS measurements for providing compensated GPS measurements. Further, the roll and tracking compensations 66 and 68 may be applied in either order; that is either one may be applied before the other.

In FIG. 3A, the roll and tracking compensations 66 and 68 are applied to the GPS measurements and the crosstrack summer 112 compares the roll and tracking compensated GPS measurements to the desired implement path 20 for providing the compensated crosstrack error. In FIG. 3B, the roll and tracking compensations 66 and 68 are applied to the desired implement path and the crosstrack summer 112 compares the roll and tracking compensated desired implement path to the GPS measurements for providing the compensated crosstrack error. It is noted that the path-UPS difference (raw crosstrack error) 113 does not need to be explicitly measured in the apparatus 100.

Figure 3C:
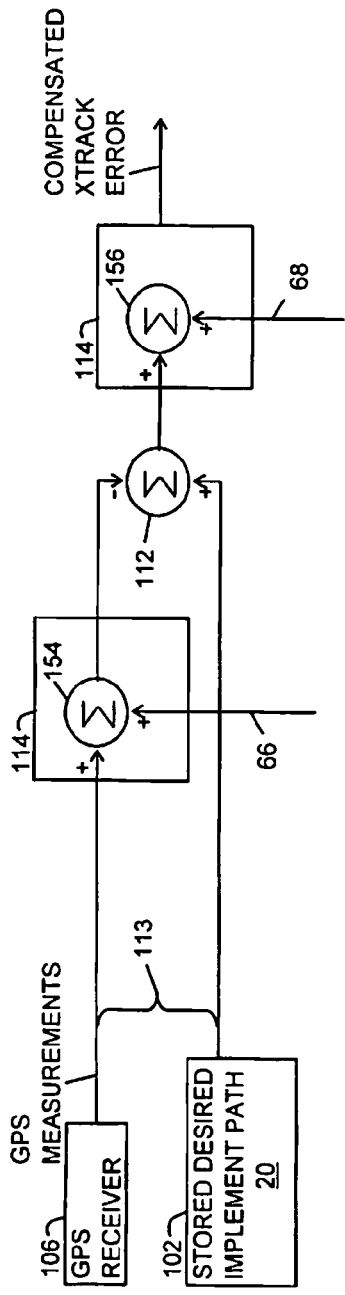

In FIG. 3C, the roll height compensation 66 is applied to the GPS measurements and the crosstrack summer 112 compares the roll compensated GPS measurements to the desired implement path 20 for providing an intermediate crosstrack error. The intermediate crosstrack error is compensated with the tracking compensation 68 for providing the compensated crosstrack error. Or, the roll and tracking compensations may be reversed so that, the crosstrack summer 112 compares tracking compensated GPS measurements to the desired implement path 20 for providing an intermediate crosstrack error and the intermediate crosstrack error is compensated with the roll height compensation 66 for providing the compensated crosstrack error.

Figure 3D:
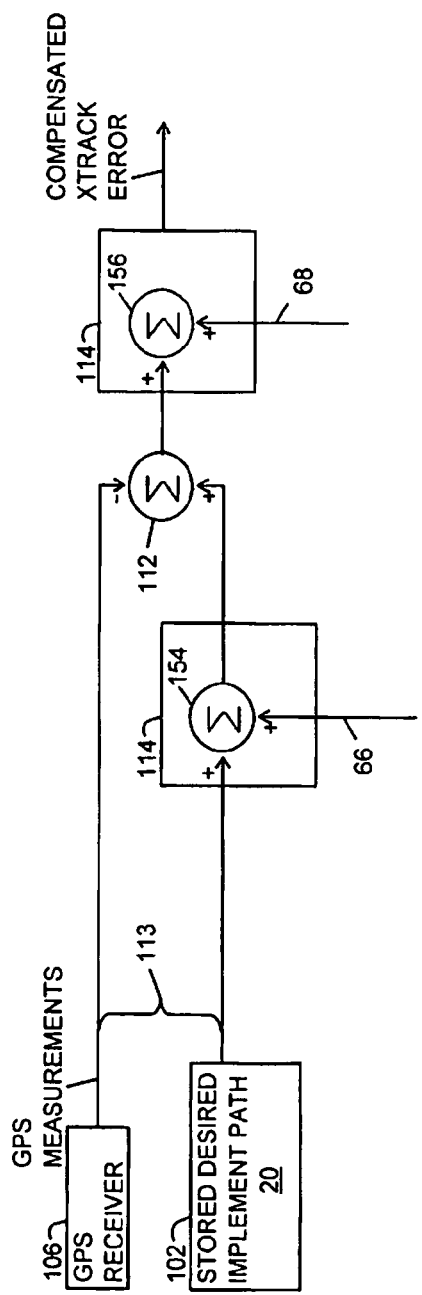

In FIG. 3D, the roll height compensation 66 is applied to the desired implement path and the crosstrack summer 112 compares the roll compensated desired implement path to the GPS measurements for providing an intermediate crosstrack error. The intermediate crosstrack error is compensated with the tracking compensation 68 for providing the compensated crosstrack error. Or, the roll and tracking compensations may be reversed so that, the crosstrack summer 112 compares a tracking compensated desired implement path to the GPS measurements for providing an intermediate crosstrack error and the intermediate crosstrack error is compensated with the roll height compensation 66 for providing the compensated crosstrack error.

Figure 4:
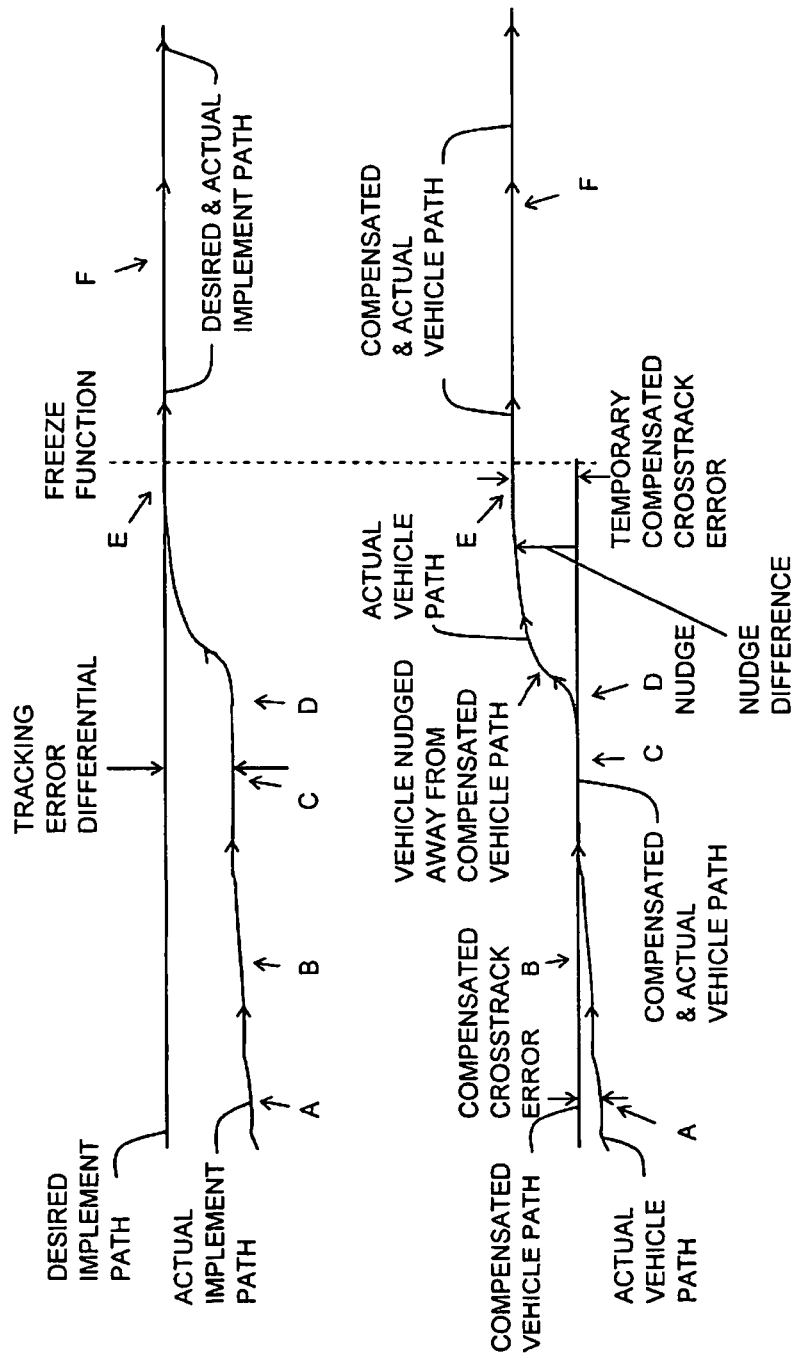
FIG. 4 illustrates a desired implement path of the farm guidance system of FIGS. 1 and 2.

FIG. 4 shows an example of the vehicle and implement paths as the vehicle 12 tows the implement 14. The apparatus 100 steers the vehicle 12 to minimize the compensated crosstrack error (the difference between the actual vehicle path measured by GNSS and the compensated vehicle path that has been calculated to eliminate the sidehill tracking error of the implement). At a point A, for whatever reason, the actual vehicle path differs from the compensated vehicle path by a non-zero value of the compensated crosstrack error. In normal steering operation, in a section B, feedback through the apparatus 100 steers the vehicle 12 to reduce the value of the compensated crosstrack error until at a point C the error is very small and the actual and compensated vehicle paths are very close. However, it is noted at the point C in the example that the actual implement path does not match the desired implement path 20 (there is a tracking error differential).

A tracking error differential between the actual and desired implement path is taken by the apparatus 100 to be due to a left over portion of a combination of the yaw error and implement sidehill drift that is not properly compensated by the current tracking compensation 68 that is provided by the current sidehill tracking function 142 for the current roll angle θ. This tracking error differential is corrected by editing the function 142. Note that the function relating the roll height compensation 66 to the roll angle θ and the GNSS antenna height 26 does not change.

At a point D, the driver nudges the actual vehicle path away from the compensated vehicle path until he or she sees, at a point E, that the actual implement path matches the desired implement path 20. The nudging continues until a nudge difference at the point E eliminates the tracking error differential from point C. The driver of the vehicle 12 may observe this match by sighting astern. Because the GPS measurements track the actual vehicle path, there is a temporary condition leading up to the point E where the negative of the current compensated crosstrack error (output of the sidehill compensator 114, FIG. 3) is approximately equal to the nudge difference 116 and they cancel each other for the input to the steering device 118. The tracking error (total), due to sidehill effects of yaw, crabbing and drift, is the tracking error differential (measured by measuring a current nudge difference 116 or a current compensated crosstrack error (output of 114)) combined with the current tracking compensation 48.

At the point E the driver directs the apparatus 100 to edit the sidehill tracking function 142 based on a measurement of the current compensated crosstrack error (or nudge difference) and the current roll angle θ so that the edited sidehill tracking function 142 provides a new sidehill tracking compensation 68 that eliminates or reduces the tracking error and brings the compensated crosstrack error to zero or near zero for the actual vehicle path. At this point E the steering nudge difference (116) is reset to zero. In a section F, in normal steering operation, the apparatus 100 uses the new (edited) sidehill tracking function 142 for providing the tracking compensation 68 for providing the compensated crosstrack error for steering the vehicle 12 to an edited compensated vehicle path so that the implement 14 is guided to an actual implement path that aligns with the desired implement path 20.

Figures 5, 6:
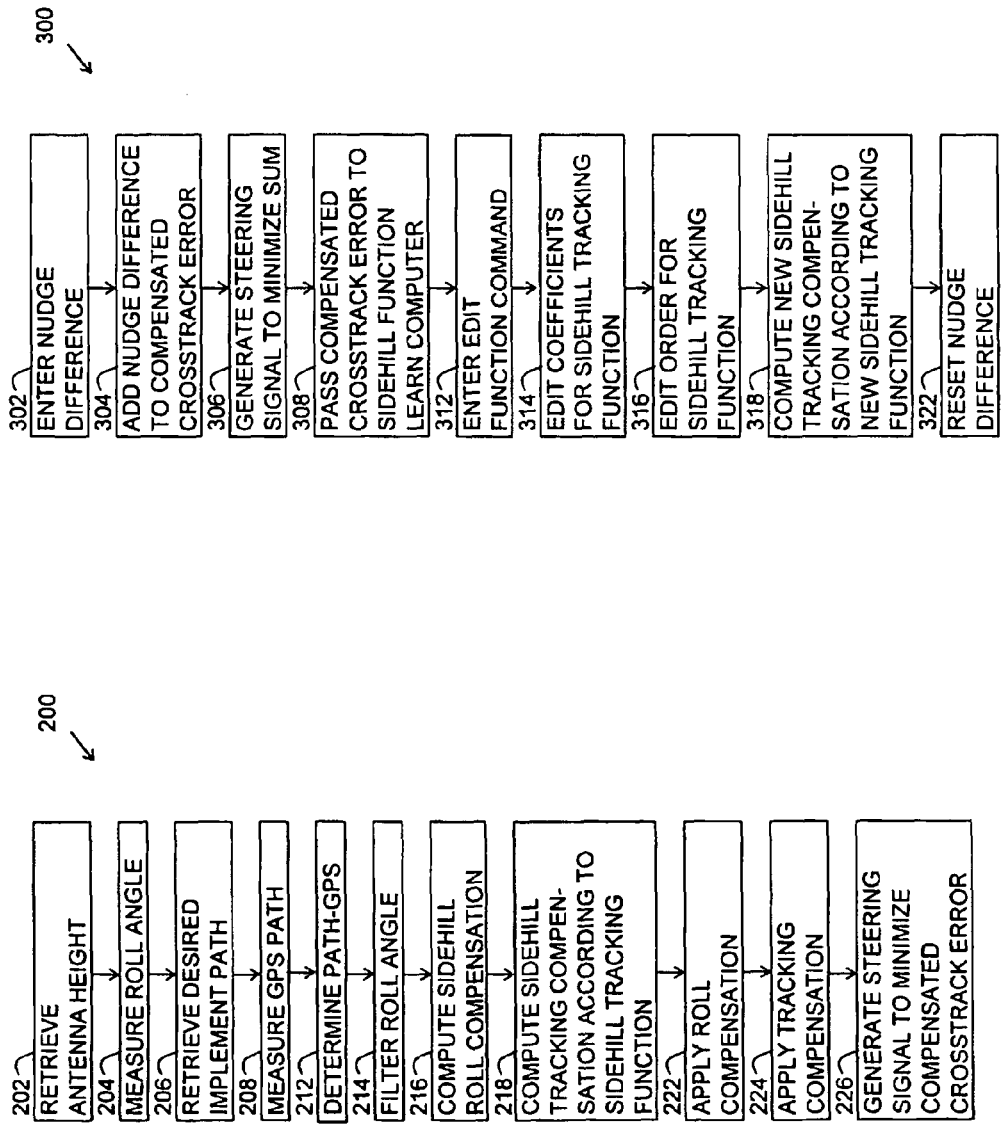
FIG. 5 is a flow chart of method for the farm guidance system of FIGS. 1 and 2.
FIG. 6 is a flow chart of a method for editing a sidehill tracking function for computing the tracking compensation of FIGS. 1 and 2.
Figure 7A:
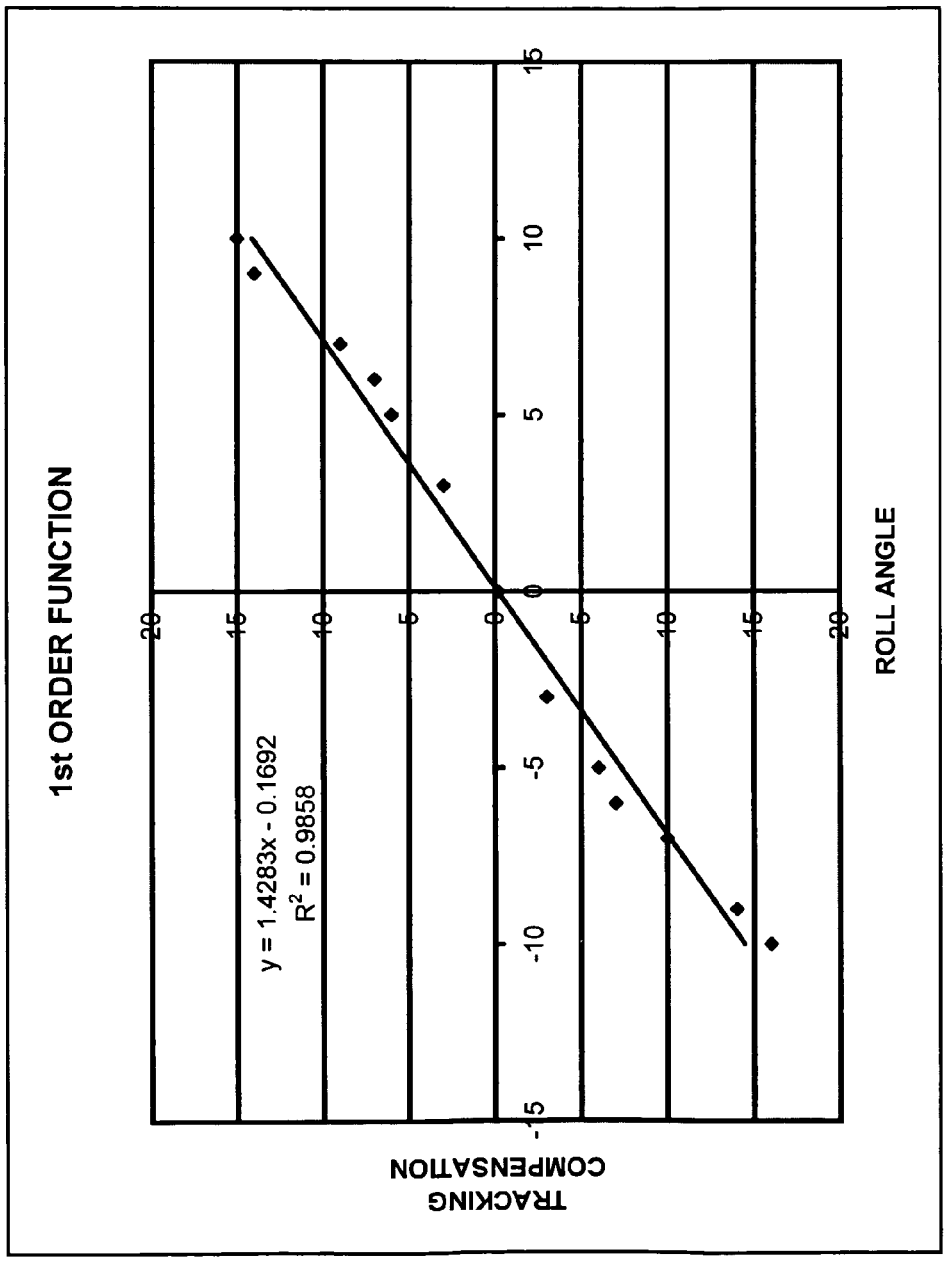
FIGS. 7A, 7B, 7C and 7D are charts for first, second, third and fifth order sidehill tracking functions for the TABLE 1.
Figure 7B:
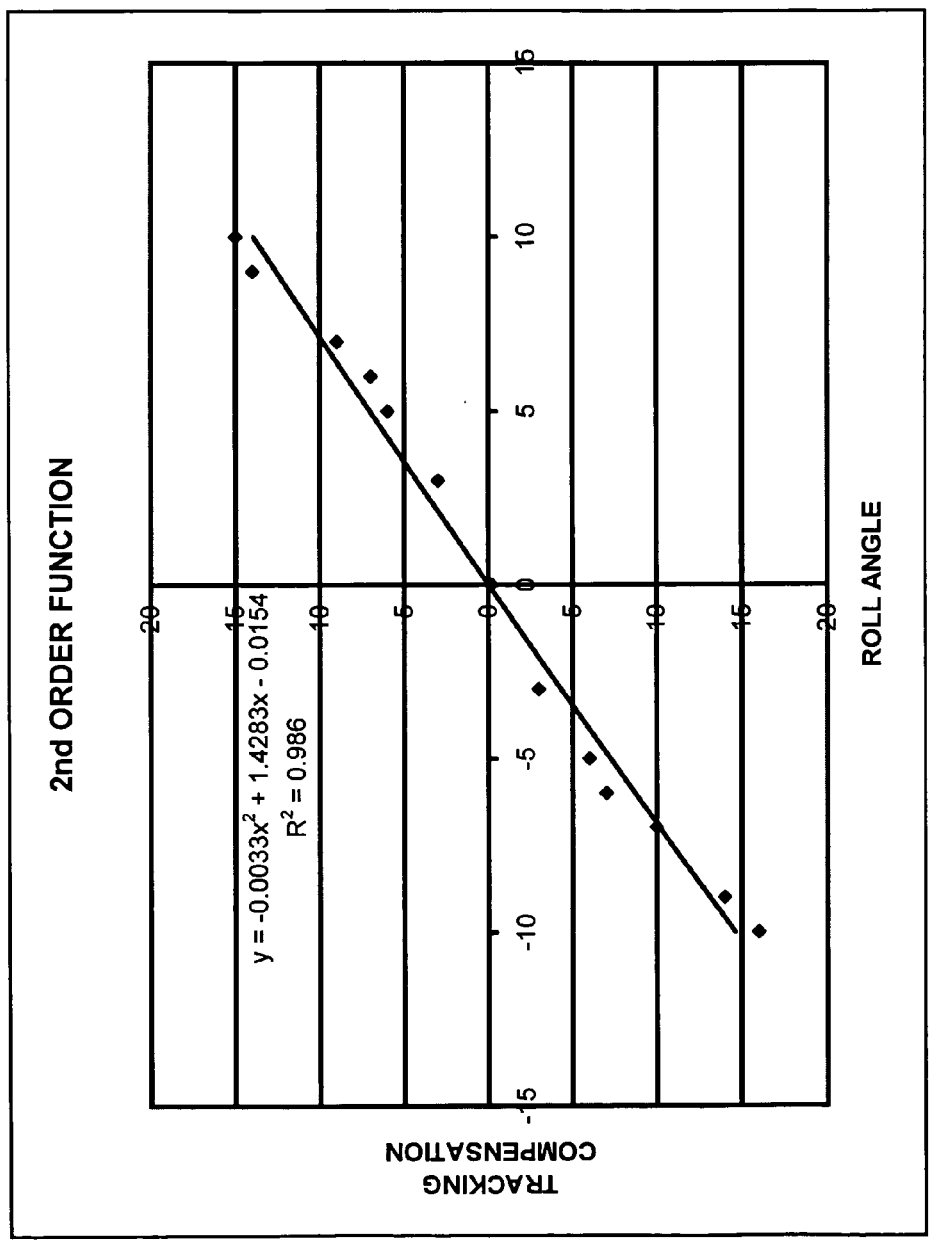
Figure 7C:
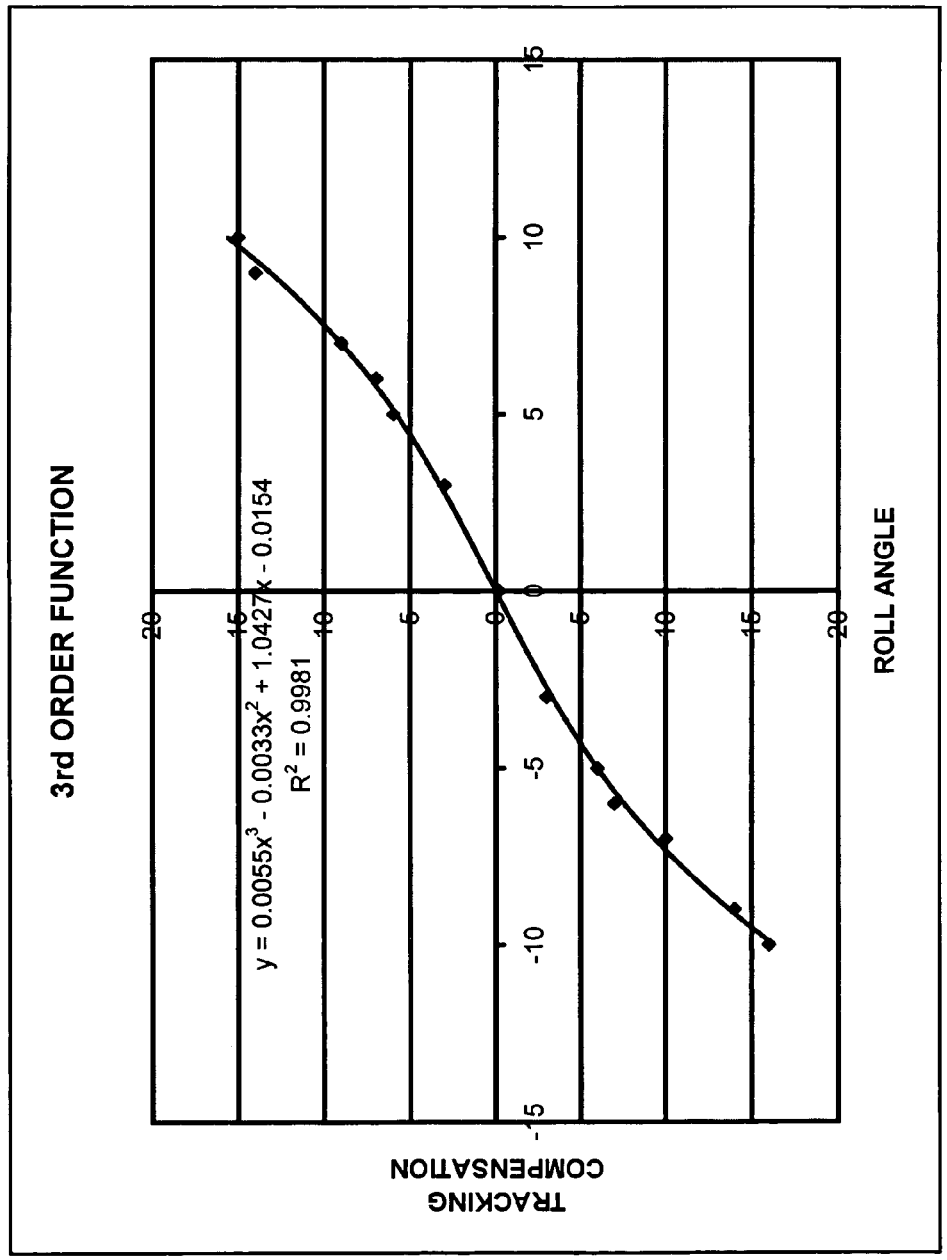
Figure 7D:
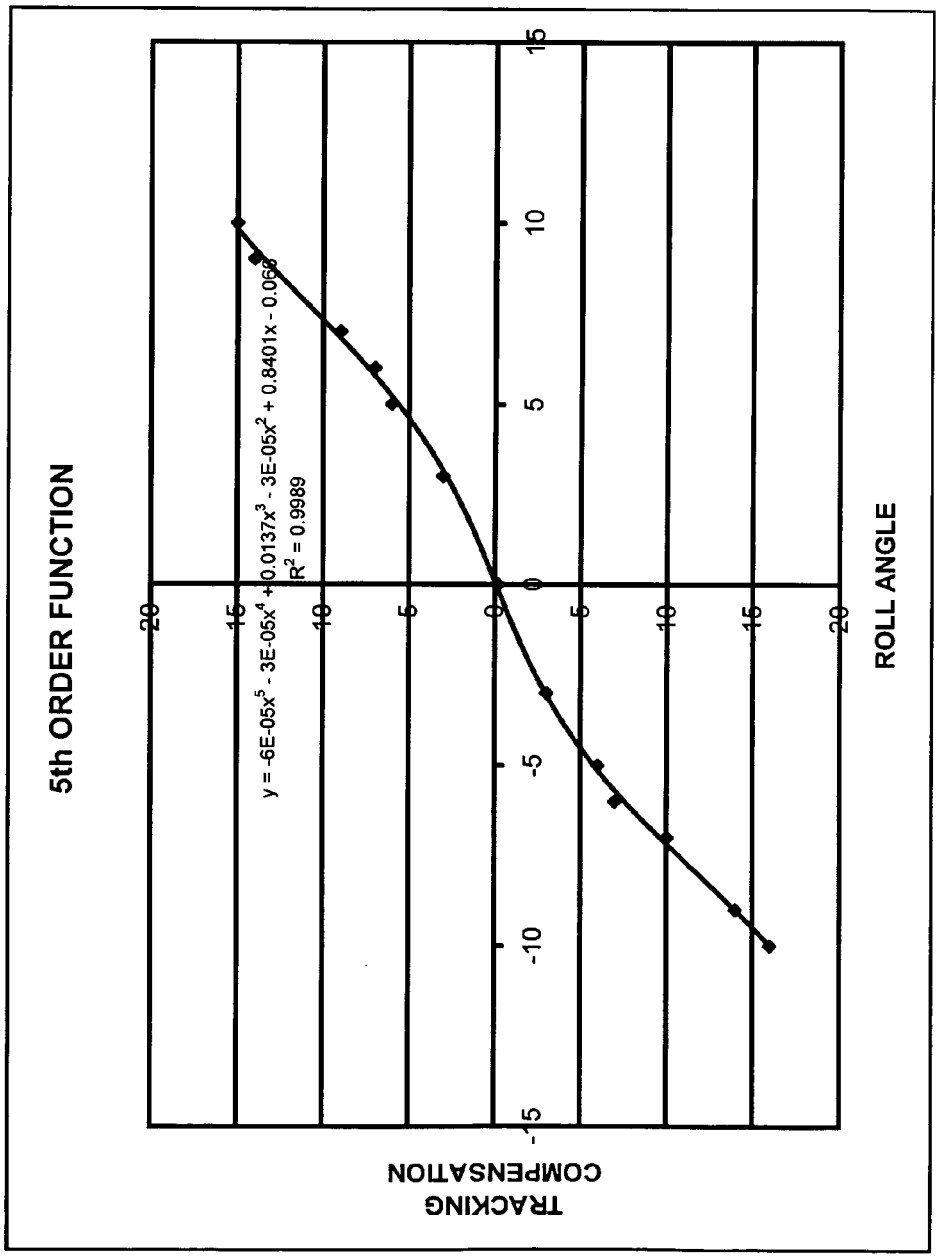

FIG. 5 is a flow chart of a method for steering a farm vehicle in order to pull an implement along a desired implement path. The steps of the method may be incorporated in a computer-readable medium 200 as an article of manufacture where the medium 200 may be read by the computer in order to direct an apparatus to carry out the steps. In a step 202 the height of the GPS antenna is retrieved from memory. This height has been entered by a manufacturer or user for the true height of the antenna above ground on the vehicle on which the GPS antenna is carried. In a step 204 a roll angle θ is measured by an inertial motion unit or an inclinometer. In a step 206 data is retrieved for the desired geographical implement path. In a step 208 a GPS receiver uses GPS signals received by the GPS antenna for measuring GPS-based positions for determining a GPS measured path.

The path-GPS difference between the desired implement path and the measured GPS path may be determined in a step 212. In a step 214, the roll angle θ is filtered. In a step 216, geometry and trigonometry are used for computing a sidehill roll height compensation from the antenna height and a filtered roll angle θ. In a step 218 a filtered roll angle θ is used in a sidehill tracking function for computing a sidehill tracking compensation. In a step 222 the sidehill roll height compensation is applied to the path-GPS difference for providing an intermediate crosstrack error. In a step 224 the sidehill tracking compensation is applied to the intermediate crosstrack error for providing a compensated crosstrack error. It should be noted that the roll and tracking compensation may be applied in either order, and that either the roll height compensation or the tracking compensation or both may be applied to the GPS measurements or the desired implement path or the difference between the GPS measurements and the desired implement path. Then, in a step 226 the compensated crosstrack error is used for determining a steering signal for steering the vehicle in order to minimize the compensated crosstrack error.

FIG. 6 is a flow chart of a method for editing a sidehill tracking function. The steps of the method may be incorporated in a computer-readable medium 300 as an article of manufacture where the medium 300 may be read by the computer in order to direct an apparatus to carry out the steps. At the start, the vehicle is being steered for minimizing the compensated crosstrack error. In a step 302 a user enters a nudge difference for steering the vehicle at a lateral offset to the compensate vehicle path that is computed with the current roll and tracking compensations. In a step 304 the compensated crosstrack error and the nudge difference are added.

The vehicle steers in a step 306 for minimizing the sum of the compensated crosstrack error and the nudge difference. The vehicle will be steered so that the current value of the compensated crosstrack error is the negative of the nudge difference. In a step 308 the value for the compensated crosstrack error (or the nudge difference) is passed to a sidehill tracking learn computer. In a step 312 a function freeze signal is entered by the user. It is intended that the user gives the function freeze signal when the actual implement path and the desired implement path are aligned.

The sidehill tracking learn computer uses the current value for the compensated crosstrack error (or nudge difference) and the filtered roll angle θ for editing the sidehill tracking function so that the edited sidehill tracking function of the current filtered roll angle θ determines a new sidehill tracking compensation that cancels the current compensated crosstrack error (or nudge difference). This can be done by editing the coefficients of the sidehill tracking function as shown in a step 314 or by editing the order of the sidehill tracking function as shown in a step 316. In a step 318 the nudge difference is reset to zero, the new edited sidehill tracking function is applied for providing a new tracking compensation, and the vehicle is again steered for minimizing the compensated crosstrack error.

TABLE 1 shows exemplary tracking errors for roll angles θ of −10 to +10. It should be noted that the tracking errors are path alignment errors that are not compensated by the roll height compensation 66. An entry row for a current roll angle θ and a current tracking error (measured from the current compensated crosstrack error or the nudge difference) is added to the table and the sidehill tracking function 142 is edited when the tracking learn computer 150 receives the freeze function signal. An entry row may be selectably erased. The sidehill tracking function 142 may be edited after each erasure. The units of the roll angles θ may be degrees or sine's of degrees. Other units may also be used because the coefficients of the sidehill tracking function 142 may provide compensation for whatever units are chosen. The units of the measured tracking errors and the computed tracking compensations 68 are typically inches or centimeters but may be any units of length. Tracking compensations 68 are shown for first order, second order, third order and fifth orders for the sidehill tracking function 142. Generally, R squared values increase (least squares error curve fit is improved) for each higher equation order of the function 142.

The order of the function 142 may be selected or an R squared value threshold may be selected. When an R squared threshold is selected, the tracking learn computer 150 calculates the order that is required for providing an R squared value that meets or exceeds the selected threshold. In a variation, the tracking learn computer 150 may be designed to edit the sidehill tracking function 142 to provide the tracking compensation 68 at a current roll angle θ that nearly exactly compensates the current tracking error. Generally, this will mean that other roll angles θ are less well compensated. In a further variation, the tracking learn computer 150 may be designed to edit the sidehill tracking function 142 using weighted averaging where the most recent tracking errors and corresponding roll angles θ are given more weight for editing the sidehill tracking function 142.

FIGS. 7A, 7B, 7C and 7D are charts showing first, second, third and fifth order sidehill tracking functions 142, respectively. The charts show measured implement sidehill tracking errors (diamonds) versus roll angles and the negative of the sidehill tracking compensations 68 (lines) versus the same roll angles. The roll angles θ are plotted on the horizontal axes. The tracking errors and negative of the tracking compensations 68 are plotted on the vertical axes. The variable sidehill tracking function 142 is constructed for providing a best fit between several values of tracking compensation 68 computed from several values of roll angle and values of implement sidehill tracking error measured at the same values of toll angle. Equations are printed on the charts for the sidehill tracking functions 142 to show the to tracking compensations 68 as "y" versus roll angles θ as "x" for first, second, third and fifth function equation orders. It should be noted that the sidehill tracking function 142 may have an order of four or a higher order than five.

In general, although the present disclosure has been described in terms of the above embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

The invention claimed is:

1. An apparatus to steer a vehicle in order to guide a farm implement along a desired path, comprising:
   a compensation computer to compute sidehill tracking compensations according to a sidehill tracking function of roll angle, said function having an order greater than one, where said function has been determined to compensate implement sidehill tracking errors for at least a first and a second said roll angle; and
   a sidehill compensator to determine compensated crosstrack errors for said vehicle based on GNSS position measurements of said vehicle and said sidehill tracking compensations, where steering said vehicle to minimize said compensated crosstrack errors guides said implement to follow said desired path.

2. The apparatus of claim 1, wherein
said function is configured to provide said sidehill tracking compensations to compensate said implement sidehill tracking errors between an actual implement path and said desired path.

3. The apparatus of claim 1, wherein:
said function is configured to provide said sidehill tracking compensations having a best fit between said sidehill tracking compensations and measurements of said implement sidehill tracking errors at several said roll angles.

4. The apparatus of claim 1, further comprising:
a steering device to steer said vehicle to minimize said compensated crosstrack errors.

5. An apparatus to steer a vehicle in order to guide a farm implement along a desired path, comprising:
a compensation computer to compute sidehill tracking compensations according to a sidehill tracking function of roll angle where said function has been determined to compensate implement sidehill tracking errors corresponding to several said roll angles; and
a sidehill compensator to determine compensated crosstrack errors based on said desired implement path, GNSS position measurements of said vehicle, and said sidehill tracking compensations; said vehicle steered to minimize said compensated crosstrack errors to guide said implement to follow said desired path; wherein:
the sidehill compensator is configured to use a time constant for said sidehill tracking compensations to cause said compensated crosstrack errors to have a slower response to changes in said roll angle than to changes in raw crosstrack errors between GNSS position measurements and said desired implement path.

6. The apparatus of claim 1, wherein:
the compensation computer includes a tracking learn computer to edit said sidehill tracking function for a current said roll angle to provide a new said sidehill tracking function to reduce a difference between an actual implement path and said desired path for said current roll angle.

7. The apparatus of claim 1, further comprising:
a function edit entry device to issue a function freeze signal to the compensation computer to fix coefficients of said sidehill tracking function.

8. The apparatus of claim 1, wherein:
the compensation computer includes a function coefficient calculator to edit said sidehill tracking function by re-calculating one or more coefficients of said function.

9. The apparatus of claim 1, wherein:
the compensation computer includes a function order calculator to edit said sidehill tracking function by increasing or decreasing the order of said function.

10. The apparatus of claim 1, wherein:
the compensation computer includes a tracking learn computer to edit said sidehill tracking function to minimize a current one of said compensated crosstrack errors when said vehicle is steered to guide said implement to said desired path.

11. The apparatus of claim 1, wherein:
the compensation computer includes a tracking learn computer to edit said sidehill tracking function for a best fit between said sidehill tracking compensations and said implement sidehill tracking errors at several said roll angles.

12. An apparatus to steer a vehicle in order to guide a farm implement along a desired path, comprising:
a compensation computer to compute a sidehill tracking compensation according to a variable sidehill tracking function of a roll angle where said variable sidehill tracking function has been determined to compensate an implement tracking error corresponding to said roll angle; and
a sidehill compensator to determine a compensated crosstrack error based on said desired implement path, GNSS position measurements of said vehicle, and said sidehill tracking compensation; said vehicle steered to minimize said compensated crosstrack error to guide said implement to follow said desired path;
a nudge summer to add a nudge difference to a current said compensated crosstrack error to provide a steering signal to align said implement with said desired implement path; and
a tracking learn computer to edit said variable sidehill tracking function based on a measurement of said nudge difference.

13. An apparatus to steer a vehicle in order to guide a farm implement along a desired path, comprising:
a compensation computer to compute a sidehill tracking compensation according to a variable sidehill tracking function of a roll angle where said variable sidehill tracking function has been determined to compensate an implement tracking error corresponding to said roll angle; and
a sidehill compensator to determine a compensated crosstrack error based on said desired implement path, GNSS position measurements of said vehicle, and said sidehill tracking compensation; said vehicle steered to minimize said compensated crosstrack error to guide said implement to follow said desired path; wherein:
the compensation computer includes a sidehill computer to compute a roll height compensation from a fixed function of said roll angle and an actual said height of said GNSS antenna above ground; and
said sidehill tracking compensation includes said roll height compensation.

14. A method for steering a vehicle in order to guide a farm implement along a desired path, comprising:
computing sidehill tracking compensations according to a sidehill tracking function of roll angle, said function having an order greater than one, where said function has been determined for compensating implement sidehill tracking errors for at least a first and a second said roll angle; and
determining compensated crosstrack errors for said vehicle based on GNSS position measurements of said vehicle and said sidehill tracking compensations, where steering said vehicle to minimize said compensated crosstrack errors guides said implement to follow said desired path.

15. The method of claim 14, further comprising:
determining said function for providing said sidehill tracking compensations for compensating said implement sidehill tracking errors between an actual implement path and said desired path.

16. The method of claim 14, further comprising:
determining said function for providing said sidehill tracking compensations for a best fit between said sidehill tracking compensations and measurements of said implement sidehill tracking errors at several said roll angles.

17. The method of claim 14, further comprising:
steering said vehicle for minimizing said compensated crosstrack errors.

18. A method for steering a vehicle in order to guide a farm implement along a desired path, comprising:
computing sidehill tracking compensations according to a sidehill tracking function of roll angle, where said function has been determined for compensating implement sidehill tracking errors corresponding to several said roll angles;
determining a sidehill compensated crosstrack error based on said desired implement path, GNSS position measurements of said vehicle, and said sidehill tracking compensations; said vehicle steered for minimizing said compensated crosstrack errors for guiding said implement to follow said desired path; and
providing a time constant to said sidehill tracking compensations for causing said compensated crosstrack errors to have a slower response to changes in said roll angle than to changes in raw crosstrack errors between said GNSS position measurements and said desired implement path.

19. The method of claim 14, further comprising:
editing said sidehill tracking function for a current said roll angle for providing a new said sidehill tracking function to reduce a difference between an actual implement path and said desired path for said current roll angle.

20. The method of claim 14, further comprising:
issuing a function freeze signal for fixing coefficients of said tracking function.

21. The method of claim 14, further comprising:
editing said function by re-calculating one or more coefficients of said function.

22. The method of claim 14, further comprising:
editing said function by increasing or decreasing the order of said function.

23. The method of claim 14, further comprising:
editing said sidehill tracking function for minimizing a current one of said compensated crosstrack errors when said vehicle is steered for guiding said implement to said desired path.

24. The method of claim 14, wherein:
computing said sidehill tracking compensation includes editing said sidehill tracking function for a best fit between said sidehill tracking compensations and said implement tracking errors at several said roll angles.

25. A method for steering a vehicle in order to guide a farm implement along a desired path, comprising:
computing a sidehill tracking compensation according to a variable sidehill tracking function of a roll angle, where said variable sidehill tracking function has been determined to compensate an implement tracking error corresponding to said roll angle;
determining a sidehill compensated crosstrack error based on said desired implement path, GNSS position measurements of said vehicle, and said sidehill tracking compensation; said vehicle steered for minimizing said compensated crosstrack error for guiding said implement to follow said desired path;
adding a nudge difference to a current said compensated crosstrack error for providing a steering signal for aligning said implement with said desired implement path; and
editing said variable sidehill tracking function based on a measurement corresponding to said nudge difference.

26. A method for steering a vehicle in order to guide a farm implement along a desired path, comprising:
computing a sidehill tracking compensation according to a variable sidehill tracking function of a roll angle, where said variable sidehill tracking function has been determined to compensate an implement tracking error corresponding to said roll angle;
determining a sidehill compensated crosstrack error based on said desired implement path, GNSS position measurements of said vehicle, and said sidehill tracking compensation; said vehicle steered for minimizing said compensated crosstrack error for guiding said implement to follow said desired path;
computing a roll height compensation from a fixed function of said roll angle and an actual said height of said GNSS antenna above ground; and
using said sidehill tracking compensation includes said roll height compensation.

* * * * *